United States Patent
Heath et al.

(10) Patent No.: US 9,734,373 B1
(45) Date of Patent: Aug. 15, 2017

(54) METHOD OF READING ANIMAL MARKS

(71) Applicant: Vium, Inc., San Mateo, CA (US)

(72) Inventors: Kyle Howard Heath, Menlo Park, CA (US); Jonathan Betts-Lacroix, Belmont, CA (US)

(73) Assignee: Vium, Inc., San Mateo, CA (US)

( * ) Notice: Subject to any disclaimer, the term of this patent is extended or adjusted under 35 U.S.C. 154(b) by 0 days.

(21) Appl. No.: 15/253,528

(22) Filed: Aug. 31, 2016

(51) Int. Cl.
  *G07F 7/10* (2006.01)
  *G06K 7/14* (2006.01)
  *G06K 19/06* (2006.01)

(52) U.S. Cl.
  CPC ..... *G06K 7/1413* (2013.01); *G06K 19/06028* (2013.01)

(58) Field of Classification Search
  CPC .................................................. G06K 7/1413
  USPC .................. 235/380, 382; 386/285; 707/769; 705/26.1
  See application file for complete search history.

(56) References Cited

U.S. PATENT DOCUMENTS

| | | | | |
|---|---|---|---|---|
| 8,682,739 B1* | 3/2014 | Feinstein | ............... | G06Q 30/06 705/26.1 |
| 9,218,364 B1* | 12/2015 | Garrigues | ......... | G06F 17/30864 |
| 2008/0166057 A1* | 7/2008 | Nakajima | .......... | G06F 17/30796 382/229 |
| 2015/0050010 A1* | 2/2015 | Lakhani | ......... | H04N 21/440236 386/285 |
| 2016/0150758 A1* | 6/2016 | Salem | ................... | A01K 29/005 119/421 |
| 2016/0196852 A1* | 7/2016 | Sievert | ................. | G11B 27/102 386/241 |
| 2016/0335521 A1* | 11/2016 | Jiang | ...................... | G06K 9/628 |
| 2017/0000906 A1* | 1/2017 | Betts-Lacroix | .... | A61K 49/0008 |

* cited by examiner

*Primary Examiner* — Allyson Trail
(74) *Attorney, Agent, or Firm* — Kim Rubin Patent Agent

(57) ABSTRACT

A method of reading animal identification marks is described. Starting with a series of image frames of an animal, the location and angle of the animal is determined, then the curvature of the animal tail. Using modified frames with a straightened tail, character areas are identified. For a given output character set of a number encoding method, the probability is computed for each character in the set, of that character in each character area, for each frame. The probabilities for the character set for each character area are summed over the frames. Then, the most probable character is chosen for each character area. The chosen characters are combined into a number and verified as being a currently valid animal ID. If the number is not valid, a next most probable character is chosen. This method may be applied separately for a human-readable marking and a machine-readable marking, both on one animal.

19 Claims, 8 Drawing Sheets

Fig. 5A
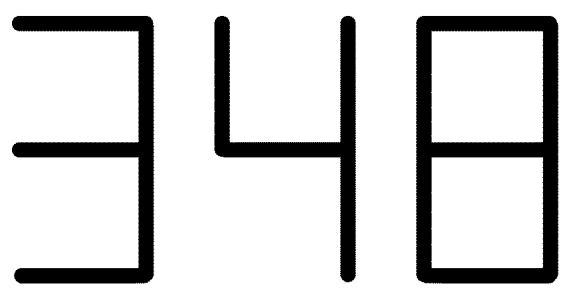
Fig. 5B
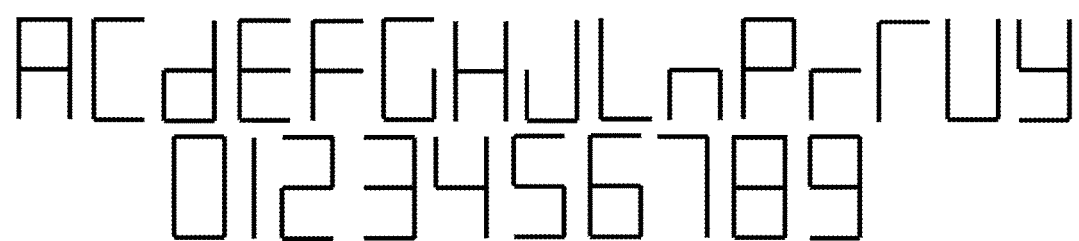
Fig. 5C
B I K M O Q S V W X Z

Fig. 9

```
import cv2
import numpy as np
from numpy import linspace
from scipy.interpolate import splprep, splev class TailSplineRectifier(object):

def __init__(self, width = 40, height = 150):
        self._rectifier = PathRectifier(width, height)
        return def rectify(self, tailspline_proto, image):
        points_x = [ pt.x for pt in tailspline_proto.points ]
        points_y = [ pt.y for pt in tailspline_proto.points ]
        path = [ points_x, points_y ]

return self._rectifier.rectify(path, image)

class PathRectifier(object):

def __init__(self, width = 75, height = 100, perpendicular_range = 0.12):
        self._width = width
        self._height = height
        self._perpendicular_range = perpendicular_range
        self._map = np.zeros((self._height, self._width, 2), dtype=np.float32)
        return def _init_map_test(self):
        print self._map.shape
        for i in range(self._height):
            for j in range(self._width):
                self._map[i,j,0] = i*1.5
                self._map[i,j,1] = j*1.5
        return def _init_map(self, path):
        # spline parameters
        s=0 # smoothness parameter (0=interpolate)
        k=3 # spline order
        nest=-1 # estimate of number of knots needed (-1 = maximal)

# find the knot points
```

```
        return def rectify(self, path, image):
        self._init_map(path)
        return cv2.remap(image, self._map, None, cv2.INTER_CUBIC)

# def main():

#     #filename = 'lena.jpg'
#     #path = np.array( [[160, 135, 125, 119, 117, 120],
#     #                  [64, 99, 118, 141, 180, 192]])

#     filename = 'tail_test_01.jpg'
#     path = np.array( [[840, 837, 833, 831, 826, 818],
#                       [593, 662, 727, 745, 771, 819]])

#     src_img = cv2.imread(filename)
#     r = PathRectifier(path)

#     dst_img = r.apply(src_img)

#     cv2.imshow('src', src_img)
#     cv2.imshow('dst', dst_img)
#     cv2.waitKey(0)
#     return

# if __name__ == "__main__":
#     main()

```

METHOD OF READING ANIMAL MARKS

FIELD OF THE INVENTION

The invention relates to management of animals in a vivarium for both husbandry and study purposes. More specifically it relates to uniquely identifying animals in the vivarium. Yet more specifically, it is directed to reading markings on animals: both human-readable and machine-readable identification marks.

BACKGROUND

Vivaria house a number of animals, typically test animals, such as mice, in a number of cages, often a large number. The test animals are frequently used to test drugs, genetics, animal strains, husbandry experiments, methods of treatment, procedures, diagnostics, and the like. We refer to all such uses of a vivarium as a study.

The animals in a vivarium must be observed, either manually by humans or by automated means, such as by the use of video cameras and video analytics software. Comparisons of animals are the basis of any study result.

There are a large number of animal characteristics, attributes, or behavior that may be of interest in a study. We refer to all such observable aspects of animals as "behaviors," including blood, saliva, feces, urine, breath, and fur attributes. Observations of behaviors may be manual or automated and may be invasive or non-invasive. They may occur in the animal's home cage; or in a separate observation or test cage or apparatus; or via pathology or other chemical, biological or analytical analysis. Observations and results may use statistics or aggregated behaviors.

For observing all such behaviors, it is critical that the observed behaviors be reliably, easily, and quickly linked to one particular animal. It is also necessary that marking the animals be consistent, fast, reliable and low cost. It is also necessary that reading the animal ID be highly reliable, fast, and low cost. Not only is it necessary that reading be reliable, but also necessary that the actual reliability is measurable. It is desirable that reading algorithms are adjustable such that higher reliability may be traded off against more "non reads." It is also desirable that the size of a code space used may be traded off against readability.

Prior art uses a variety of animal identification systems, including one animal per cage, ear notches, ear tags, foot and toe pad tattooing, embedded RFID, attached RFID, body tattoos, and tail tattoos. Some prior art uses human-readable markings, such as ear notches or ID numbers tattooed on a tail. Some prior art uses machine-readable markings, such as RFIDs, ear-tag barcodes, and tail barcodes.

In an ideal world, each animal might receive a globally unique ID that is never re-used. However, that requires a large code space, which in return requires complex markings. Small animal tails are a poor choice substrate for placing readable codes. complex codes either cannot be marked at all, or do not read reliably. In prior art practice, markings are often in a very small code space and other systems are used to uniquely identify an animal. One such prior art method is a marking that is unique only within a single cage. For example, colored ear tags may be used, with only five colors available. Alternatively, ear notches may be used providing a code space size of less than 100. Another prior art method uses unique markings within a single study. Animals in one study are generally kept well apart from animals in another study; thus, unique marking within one study may be sufficient.

All such prior art has significant weaknesses. For machine-readable markings weaknesses include:
risk of confusing one animal with another, for example, if an animal is moved to a wrong cage
not human-readable
slow reading
requires specialized equipment
expensive equipment and expensive to read
computer required to read and map animal ID
may have single-vendor lock-in
two hands often required to use equipment
accuracy and reliability may not be computable or traceable
slow and expensive to mark animals
limited through rate for marking new animals
animals may have to be a minimum age to mark
may work only in-cage or may work only out-of-cage
either applying marks or reading marks may not be sterile
animal may have to anesthetized to be marked.
For human-readable markings weaknesses include:
risk of confusing one animal with another, for example, if an animal is moved to a wrong cage
often not machine-readable
may not be readable in the dark—the animals' natural activity period
reading may be unreliable
typically has a small code space
requires manual data entry to link animal ID to stored data
likely not suitable for machine marking
high labor cost for marking
accuracy and reliability may not be computable or traceable
limited through rate for marking new animals
slow through rate for marking new animals.
Embodiments of this invention overcome many of the weaknesses of prior art.

SUMMARY OF THE INVENTION

In one exemplary embodiment images of animal tails are recorded as a series of video frames. Each frame is analyzed to determine the most probable characters in a marking code. Marking codes may be human-readable decimal digits or a machine-readable vine code, as two simple examples. Multiple frames are so analyzed. Individual characters may be more visible or better recorded in some frames than others, due to the position of the animal tail, lighting, camera angle, detritus on the tail, and other reasons. Thus, it is desirable to consider the information from multiple frames in deciding which characters in the markings are most probable.

In one embodiment, first an animal is located in each video frame, and the angle of the animal is determined. From there, the start of the tail is located and then the tail is located. In particular, the curve of the tail is determined. Then an image or its equivalent is constructed where the curve tail is "straightened.' From that image the individual character positions are located. We refer to these locations a "blobs."

Then, each blob is compared against a set of reference or canonical character images. Image processing algorithms determine a probability for each character in the used character set in the blob. These probabilities may be viewed as a chart with each character on the horizontal axis and probabilities on the vertical axis. One such chart or its equivalent is created for each blob position from each video frame.

Then, these probabilities are summed across all video frames. The result is one aggregate probability chart for each blob position on the animal tail.

Then, the most probably character is selected from each chart. These characters are combined to form a candidate number. For example, if markings are three decimal digits, the characters "3," "4" and "8" may be determined as the most probable for three blobs on one tail. These three characters may be combined into the candidate number, 348.

Then, this candidate number is looked up to see if it is a valid animal ID. The lookup may involve multiple steps or use additional information, such as cage number, time of read, other markings, and the like. If the candidate number is so valid, it is associated with the animal in the original video.

If the candidate number is not so valid, then, in some embodiments, the next most probable character or characters are chosen from one or more blob aggregate probability charts. Thresholds may be used to avoid selecting low-probability "next most likely" characters. These next most likely characters are again combined, looked up, and verified. It may be that no combination meets the necessary probability thresholds and validation. In which case, the embodiment does not successful associate a number with the animal in the video.

One advantage of these embodiments is that the probability threshold may be adjusted based on the requirement of more reliable reads against not getting any read, in some cases.

Another advantage of these embodiments is that the method provides an output probability that the read is actually correct.

Yet another advantage of these embodiments is that the method provides a higher chance of reading correctly when the characters in the character set used are highly distinct from each other. Typically that means the character set is smaller, and thus the total codes space available for marking animals in a set is smaller. Thus, particular requirements for a large code space may be traded off for better readability, higher read rate, or more reliable reads.

Marked codes read may be human-readable or machine-readable or both. More than one code type may be marked on a single animal. The method may be applied to the one or more codes either prior to the validation step or after. That is, validation may apply separately to multiple markings or may apply to the combination of multiple markings.

Exemplary symbol sets may be numeric, alphanumeric, vine codes, or any of many other known marking code systems. Multiple symbol sets may be used. The number of symbols in a mark may be variable.

BRIEF DESCRIPTION OF THE DRAWINGS

FIG. 5A shows an exemplary human-readable code.

FIG. 5B shows an exemplary human-readable symbol set.

FIG. 5C shows an exemplary set of capital letters missing from a human-readable symbol set.

FIG. 9 shows an exemplary code fragment of straightening tail images.

DETAILED DESCRIPTION OF THE INVENTION

Figure 1:
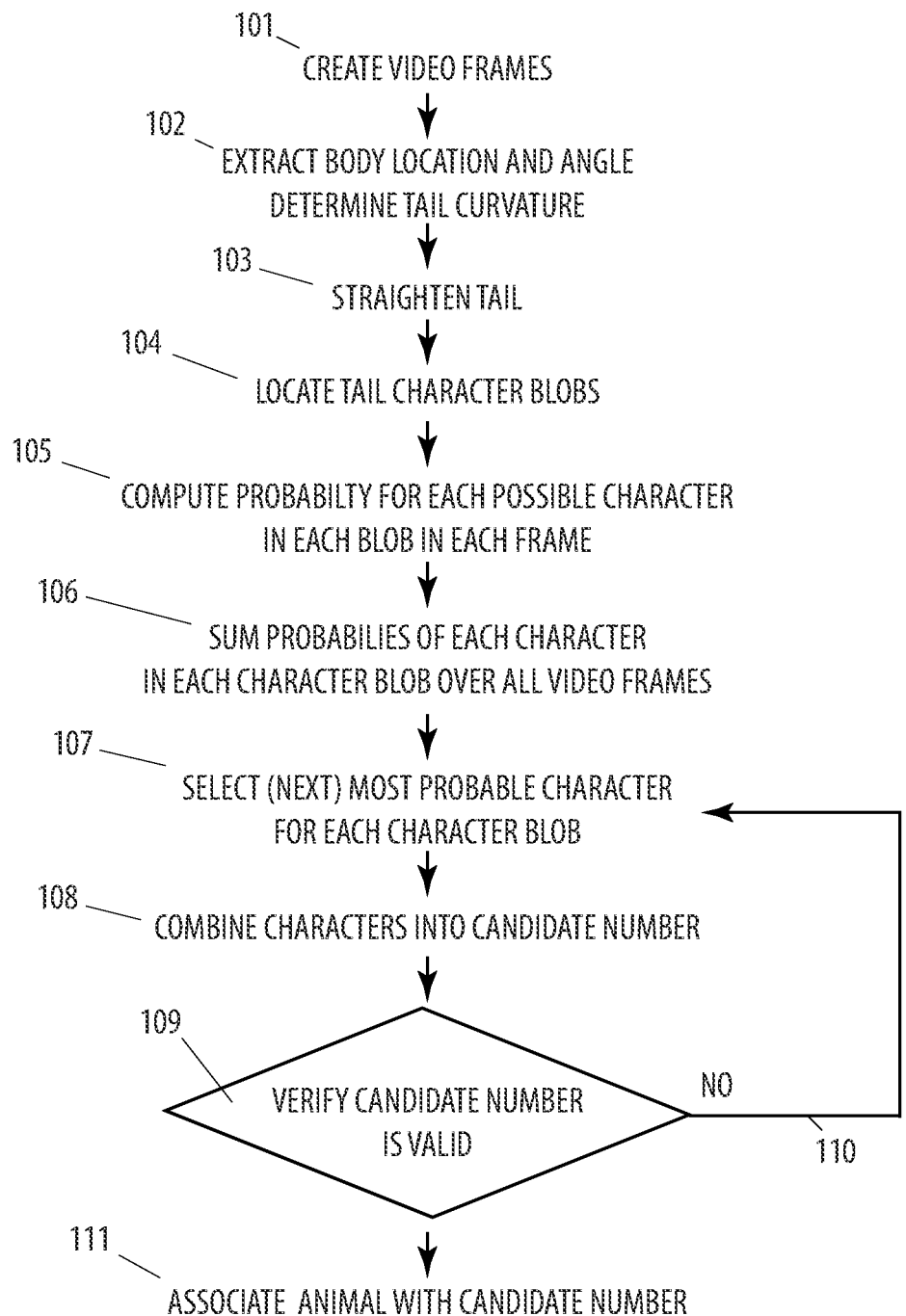
FIG. 1 shows exemplary steps in a method of this invention.

Looking at FIG. 1 we see an exemplary embodiment. In step 101 video frames may be recorded of the interior of a cage in a vivarium, which houses more than one animal, such a mice or rats. For such cages, it is critical to know which mouse is which. Other embodiments of this invention are not restricted to rodents, or to tails, or to animals, or to vivaria. "Video frames" is to be interpreted broadly. Multiple frames from multiple cameras may be used; cameras other than video cameras may be used; light source other than visible light may be used; indeed, images may be created using no light at all; frame may be highly variable, from one frame per year to thousands of frames per second; frames may acquired in a short, contiguous time sequence or acquire over a long period time, from non-contiguous time intervals.

In step 102 a body location and body angle, such as for a mouse, is determined within each frame. In some embodiments, this step is optional or the information comes from another source. The interpretation of "body" should be broad, such as including a limb, package or code mark perimeter. If a marking is on a tail, the tail location and curvature are determined.

In step 103 a tail, if any, is straightened. Although it is useful to think of a video frame image, or a portion of that image comprising the tail, as being distorted or morphed so that the tail appears straight, such transformation may be more mathematical, such as determining a set of points, spline coefficients, a transformation matrix, and the like. For example, in later steps such as step 104, "locating character blobs," a transformation matrix or other numerical map from step 103 may be used directly, rather than an actual morphed image created. Steps 103 and 104 may be, in one embodiment, combined into a single step.

In step 104 the location of characters or symbols in one or more markings is determined. The number of symbols marked may be variable and this step may also determine the number of symbols marked. More than one code may be marked. One code may be human-readable and another code machine-readable. Such codes may be read separately by executing all of part of the method of FIG. 1 separately, or such multiple marks may be executed in parallel. For multiple marks, some steps in the method may be shared while others are separate. If there is no tail, then this step applies to any symbol data in the video frames. A specific code type may be determined in this step.

In step 105 we compute probabilities for each possible character from our output symbol set for each blob in each frame. For example, if there are M frames and D blob locations—or D output symbols in the mark—and K possible output characters we compute M*D*K probabilities. These are grouped into M*D probability sets, which may be thought of as "charts," such as those shown in FIG. 7.

In step 106 we sum the probability charts for all valid frames. In this step, some frames may be rejected for various reasons, such as no one symbol has a sufficiently high probability, or a non-valid symbol has been detected, or the location of a blob in this frame is not valid. We now have D aggregate probability sets, each set with K elements, each element representing the aggregate probability of a particular symbol K at one of D symbol locations. The summations may be weighted. For example, those frames with clearly identified most-probably symbols may be weighted higher. As another example, frames with no clearly identifiable symbols may be given a low weight, including zero. Such frames may be considered as "noise" and thus discarded.

In step 107 we now select, for each location D, the most probable symbol. If no symbol means a minimum probability the method may stop at this point, outputting in effect, "no read."

In step 108, we combine the most probably characters into a candidate number. For example, if markings are three decimal digits, the characters "3," "4" and "8" may be determined the most probably for three blobs on one tail. These three characters may be combined into the candidate number, 348. For a vine code the combining may be less intuitive. For example, a vine code with four leaves where each leaf is one of four possible symbols, may encode 8 bits. This, four characters (leaves) would be combined to produce an 8-binary number. A code may have built-in error-correction symbols. That error correction would be performed in this step. If a code uses alphanumeric as its input character set, the "candidate number" may in fact be an alphanumeric string.

Figure 6:
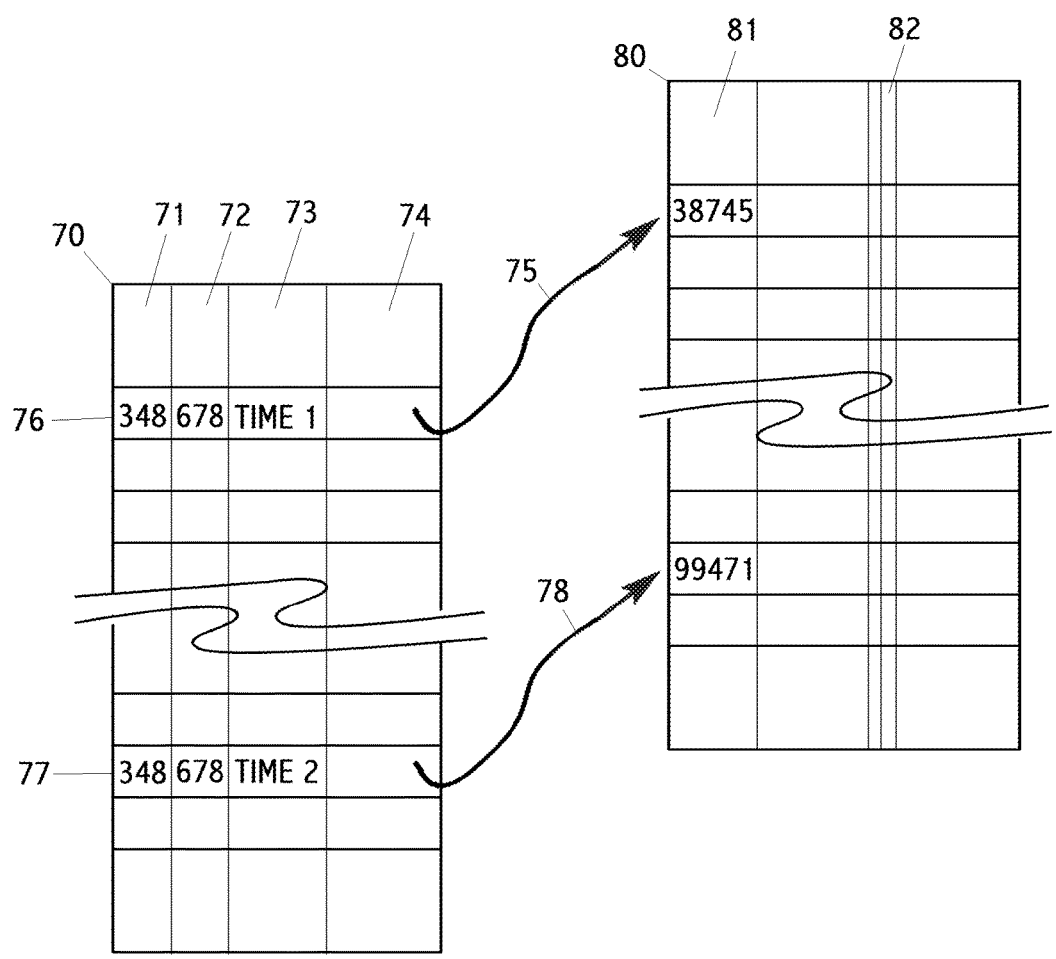
FIG. 6 shows a first mapping table that uses both the numbers for the human-readable marking and the machine-readable marking to index into a primary key table, to be used for validation.

In step 109 we verify or validate the candidate number. There are many ways such a candidate number may be validated. The read code may have "check digits," parity or some other built-in validation aid. This step may be used to consider such internal validation aid. FIG. 6 provides additional information on how a candidate number may be validated. If there are two or more markings on an animal tail, they may be validated individually or in combination. A validate table, such as table 70 in FIG. 6, may be used to determine of a particular combination, a candidate number or numbers, has an entry or a valid entry in the table. Additional information may be used to determine validity, such as the time of the read in step 101, a cage number, or other data.

Step 109 may have multiple sub-steps to determine validity. Referring to table 80 in FIG. 7, a first sub-step may be to look up a candidate number, say in table 70, and then use that entry as an index or reference to a primary key table to determine final validity. Additional information to determine validity, such as cage number or time of read may be in table 70 or table 80. Such lookups and the description herein are schematic and should be interpreted broadly as many different technologies for validation are known in the art.

Should the validity in step 109 fail, in some embodiments the next most probably character or characters may then be used, as shown by arrow 110, where step 107 is executed again, now looking at the next most probably symbol. A next most probable symbol may be selected only if it has a particular minimum probability. Alternatively, a next most probably symbol may be selected only when the difference between the most probably and the next most probably symbol is less than a difference threshold. The iteration by arrow 110 may occur never, once, a maximum number of times, variable number of times, or an unlimited number of times. Consider an application where the codes space, is, say 256,000 while there are five animals per cage. Given the cage number, the animal ID must be one of only five. in such as case, there may be many iterations to find a valid animal ID, where valid means one of the five known animals in the known cage. However, alternatively, "valid" may mean only that there is a live animal, somewhere, with the candidate number as an ID. Such a determination may be made by fields in table 80. The animal may not supposed to be in the cage where the video frames were captured. However, in this case, it may be important to accept the ID as valid and then, outside of the embodiment shown in FIG. 1, generate a warning that an animal may be in a wrong cage.

Finally, in step 111 we accept the candidate number as valid and associate it with the animal from whom the video was captured in step 101.

Software, algorithms, commands, methods and tools exist and are well known in the art for specific steps and sub-steps of embodiments. For example, image location and extraction algorithms include SURF, BRIK, MSER and SIFT. Some of these generate both probabilities and transformation matrices directly useful in the method steps of embodiments. Also, the RANSAC algorithm may be used to eliminate outlier frames to be discarded or outlier blobs to be ignored or outlier symbols to be ignored. Image processing steps include, in some embodiments, steps 102, 103, 104, and 105. Line-follower algorithms or image location algorithms may be sued for step 103.

One advantage of these embodiments is that the probability threshold may be adjusted based on the requirement of more reliable reads against the not getting any read, in some cases.

Another advantage of these embodiments is that the method provides an output probability of that the read is actually correct.

Yet another advantage of these embodiments is that the method provides a higher chance of reading correctly when the characters in the character set used are highly distinctive. Typically that means the character set is smaller, and thus the total codes space available for marking animals in a set is smaller. Thus, particular requirements for a large code space may be traded off for better readability, higher read rate, or more reliable reads.

Marked codes read may be human-readable or machine-readable or both. More than one code type may be on a single animal. The method may be applied to the one or more codes either prior to the validation step or after. That is, validation may apply separately to multiple markings or may apply to the combination of multiple markings. Exemplary symbol sets may be numeric, alphanumeric, vine codes, or any of many other marking code systems. Multiple symbol sets may be used. The number of symbols in a mark may be variable.

Figure 2:
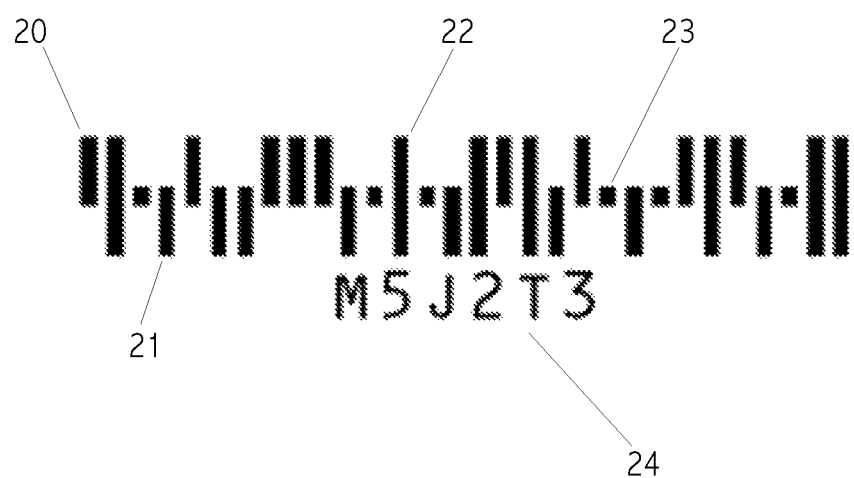
FIG. 2 shows prior art.

FIG. 2 shows prior art vine code. This is an example of one of a number of postal code symbologies. Prior art vine code symbologies do not have a marked spine. Prior art vine code symbologies have no provision for marking a bar as deleted and have no provision for adding a replacement bar for a deleted bar. Prior art vine code symbologies use pre-determined encodings and do not use a dynamic lookup table to map from a printed code to an actual identified, such as a primary key or other animal ID. That is, prior art codes are merely fixed definition fonts, not an index.

Figure 3:
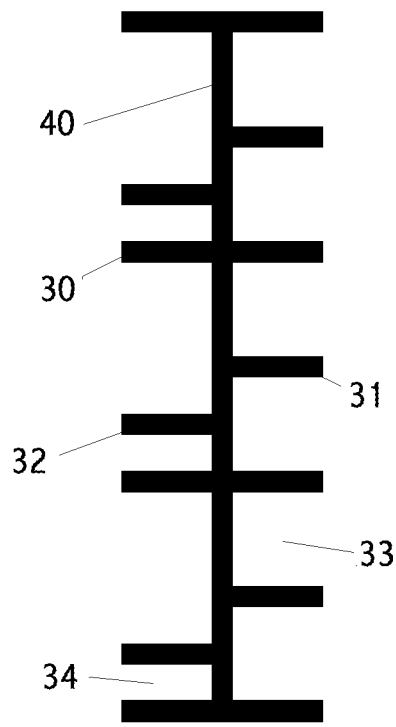
FIG. 3 shows an exemplary vine code with a spine.

Turning now to FIG. 3, we see an exemplary vine code of one embodiment. 30 is a full-width leaf. 31 is a right leaf. 32 is a left leaf. Location 33 shows a null leaf. 34 shows a fixed-width gap between leaves. Null leaves, such as 33, are detected by noticing that the gap between adjacent leaves is twice the fixed-width gap 34 plus the thickness of one line segment. Note that the prior art code in FIG. 2 does not have null leaves.

In some embodiments, each leaf of the vine code may encode two bits each. In some embodiments, two bits may be encoded as one of: (i) a right leaf 31; (ii) a left leaf 32; (iii) a full-width leaf 30; and (iv) a null leaf 33. In some embodiments a leaf that is longer than a full-width leaf may be used to indicate a deleted leaf position or a marking error. In this Figure, line width is not part of the coding. In this Figure, the spacing 34 between leaves is fixed: line width is not part of the coding. An advantage over prior art is that by ignoring both line width and line spacing in the coding, the significant real-time and growth-based dynamics of a rodent tail do not distort the marked code so as to reduce the reliability of reads or cause misreads. Even if any such misread rate is low, the misread rate not accurately computable. In addition, both line thickness and line spacing are difficult to control when tattooing, whether the tattooing is done manually or by a robot.

An exemplary vine code, such as shown in FIG. 3, may encode 8-14 bits, 12-16 bits, 14-18 bits, 16-20 bits, 18-22 bits, 20-24 bits, or 22-28 bits, 14-20 bits, or 8-28 bits. The vine code may or may not comprise check bits, parity bits, checksums, CRC, and forward error correction. Specific vine codes to mark may be selected such that a Hamming distance, where the "Hamming symbols" are each short line segment in a leaf, is maximized amongst all used codes, or amongst a subset of used codes. All leaves in the shown code have two short line segments. A full width leaf has two marked short line segment regions. A null leaf has two unmarked short line segments. Left and right leaves have one marked and one unmarked short line segment.

Figure 4:
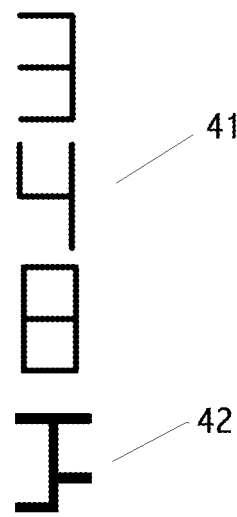
FIG. 4 shows combined machine-readable and human-readable code combination.

Turing now to FIG. 4, we see an exemplary combination of both a human-readable code portion 41 and a machine-readable code portion 42. Here the human-readable printed code is for then umber 348. The characters are printed nominally in the common, "seven-segment" format. However, other fonts or character formats may be used. the machine-readable portion is a four-leave vine code where each leaf is one of four possible leaf symbols. This code marking has a spine, which is vertical in the Figure. The top-most leaf is full-width. The second leaf is null. The third leave is right. The fourth leaf is left. Thus, 42 in this Figure shows all four leaf symbols. This code encodes 2*4=8 bits, or 256 possible input values. The three digit numeric code codes 1000 possible input values, from 0 to 999. Thus, the combination of the human-readable code and the machine-readable code encodes 256*1000=256,000 possible input values.

Turning now to FIGS. 5A and 5B, we see an exemplary symbology for the characters in a human-readable code. All characters may be formed by a non-empty subset of seven straight-line segments, arranged in a well-known "seven-segment" formation. The use of this formation is uniquely advantageous for tattooing rodent tails because each line segment may be formed by motion in only one axis. The motion may be manual or automated. Either the rodent (or the platform on which the rodent rests) may be moved, or the tattooing apparatus may be moved. In one embodiment, motion along the axis of the tail is implemented by supporting a tattooing head on a linear track, which in turn may be supported by a gantry or other support structure. In one embodiment, the other axis may be implemented by rotating the tail around the tail axis. For manual tattooing, such rotation may be via one or more finger(s) gently placed on the tail. For automatic tattooing, a motorized rubber finger or fingers may be used, effectively operating similar to manual operation. Tattooing movement in only one axis at a time is far easier for human operators, which is a unique problem, and for which this code symbology is a novel solution. See also FIG. 8.

FIG. 5A shows an exemplary coded mark, here the three characters "348," using the exemplary symbol set shown in FIG. 5B. Note that all symbols shown in FIG. 5B may be formed from a subset of the seven-segment line segments. Note that all symbols shown in FIG. 5B are readily identifiable without confusion with other symbols, and also readily memorized in codes. The marking shown in FIG. 5A may also use only decimal digits as its input set.

The symbol set for the human-readable code may comprise an alphanumeric character set comprising digits and Roman letters such as shown in FIG. 5B. The human-readable code may comprise only digits, as shown in FIG. 5A. The human-readable code may comprise an alphanumeric character set comprising digits and limited Roman letters such that the remaining Roman letters in the character set are easily recognizable and clearly distinguishable from digits or other Roman characters. The human-readable code portion may be one character, two characters, three characters, four characters, or five characters, or the range of 1-2, 1-3, 1-4, 2-3, 2-4, or 3-4 characters. One such reduced character set is shown in FIG. 5B. Here, the letters "D" and "N" are represented more closely to their traditional lower case appearance: "d" and "n" respectively. The letters T and Y appear asymmetric in the code; however, they are still easily identifiable by people. Within the context of our claims, we explicitly claim all similar reduced character sets, similarly reduced for readability in a seven-segment format, under the Rule of Equivalents.

FIG. 5C shows Roman characters not used in the exemplary symbol set due to their similarity to other digits or characters.

Another embodiment uses the seven line-segment basis expanded to nine segments by the addition of two, three, or four diagonal segments in the upper and lower rectangles formed within the digit "8." The addition of these diagonal segments permits the full 36-character alphanumeric character set to be distinctly marked.

Numeric only and alpha only symbol sets are expressly claimed as alternative embodiments to an alphanumeric symbols set.

Turning now to FIG. 6, we see exemplary elements for validation of candidate numbers or candidate animal ID. Table 70 is a "marking table" that may be used to look up a given marking on an animal. Column 71 contains values of a human-readable code mark. Column 72 contains values of a machine-readable code mark. Column 73 contains a time window. Column 74 contains a link to a primary key, or a value of a primary key. If a particular human-readable code value, machine-readable code value, and time is in the table, such as shown in row 76 and 77, then the link in column 74 will point to a valid primary key. If a particular human-readable code value, machine-readable code value, and time is not in the table, there may be no matching table row, the field in column 74 may be null, or there is indeed an entry for a primary key but the record, in table 80, shows that the primary key is not valid for this read context. Note that typically a lookup in table 70 has a "read time" associated with it. For the lookup to have a valid row in the table, the read time must be within the time window in the field in column 73. Roughly, each valid row in table 70, such as rows 76 and 77 corresponds to one animal. Note that the same human-readable code and same machine readable code may be marked on two different animals, at different times. For example, rows 76 and 77 show this. The time window values TIME 1 and TIME 2 do not overlap. Thus, for any given read time, at most only one of these two read rows will be valid. Typically, time windows are associated with a lifetime of an animal.

Table 80 is the primary key table. Column 81 holds the field for the primary key. The primary key is unique for all animals participating in this system. For example, it may be unique for all animals ever in a vivarium or in a group of vivaria. 82 shows schematically other fields in each record. Typically, there may be 30 to 50 fields, comprising information such as species, source, birthdate, cage number, one or more studies, treatments, outcomes, death date, links to other information, and much more information about a single animal per primary key. Table 80 shows primary keys for two animals, 38745 and 99471. These animals would not be alive at the same time because we see from rows 76 and 77 in table 70 that they have the same code markings.

Either table 70 or table 80 may contain additional information useful for validity determination, such as cage number or type or status of an animal.

Note that FIG. 6 is illustrative only, showing tables 70 and 80 as flat tables. In practice, many other implementations are possible, such as the use of relational databases, objects, dictionaries, arrays, other table types, and the like. Arrows 75 and 78 show the relationship between the records 76 and 77 in table 70 and the records associated with primary keys 38745 and 99471 in table 80, respectively.

Figure 7:
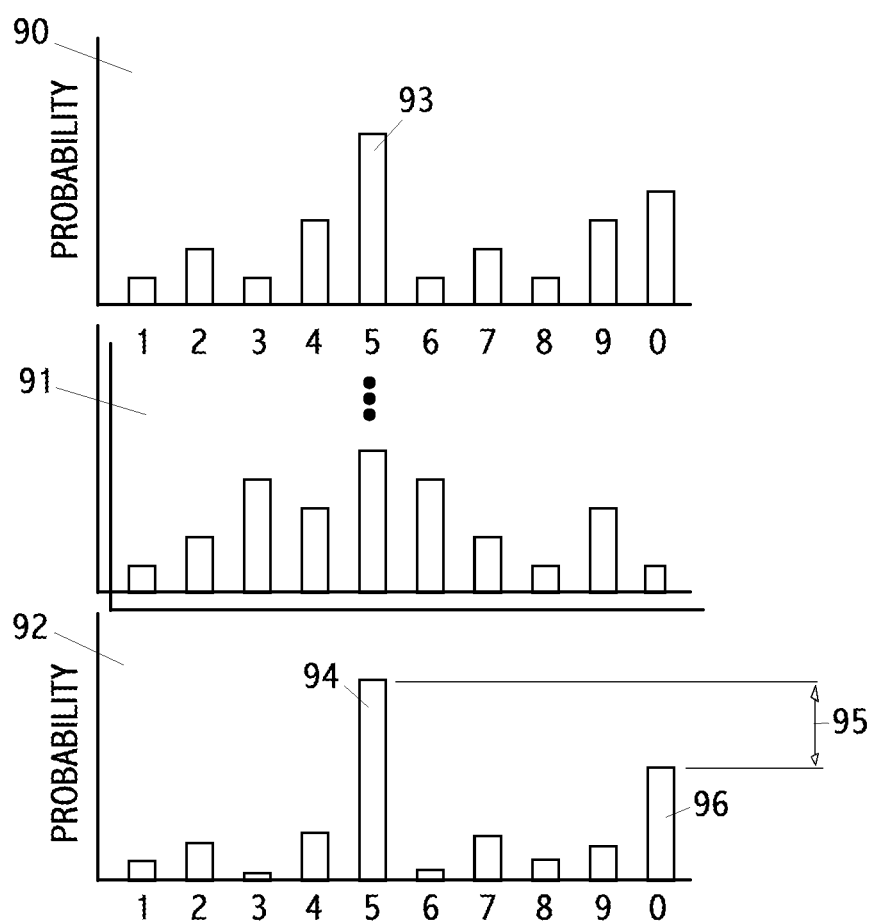
FIG. 7 shows creating aggregate probability sets from different frames.

Turning now to FIG. 7, we see one schematic, visible representation of embodiments of steps 105, 106 and 107. Chart 90 shows one exemplary probability table or set for one blob from one frame. Here, there are 10 possible symbols, so K=10. 93 shows the most probably character in this chart, symbol, "5." 91 shows schematically other probability charts or sets, each for the same blob location but from different frames. If there are S total frames then there will be S total probability charts or sets, with the possible exclusion of some sets or some frames as described elsewhere. The probabilities are then summed over all valid frames to produce an aggregate probability chart or set, 92. Here we see that symbol, "5," clearly has the highest probability, 94. Symbol "0" has the second highest probability, with the probability difference between the two symbols shown as 95.

Figure 8:
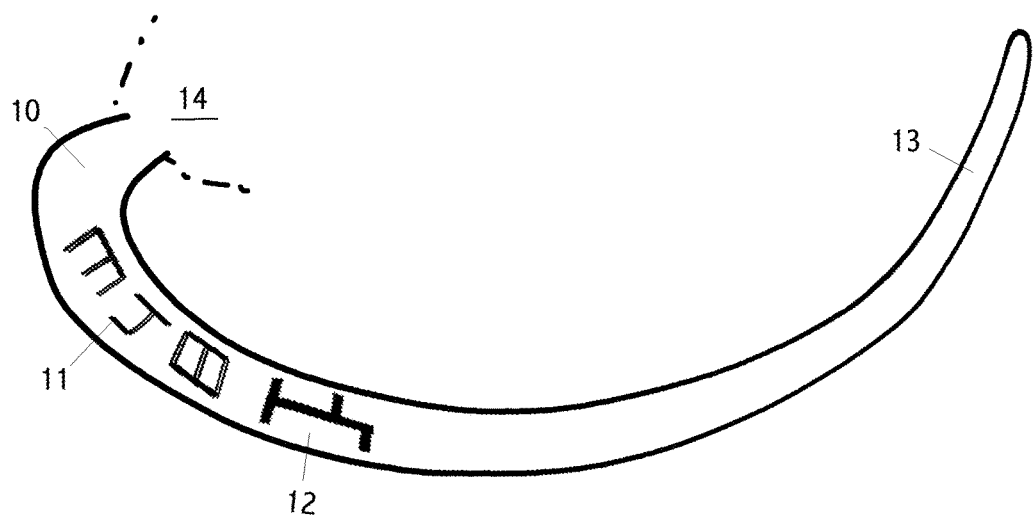
FIG. 8 shows a rodent tail with a combined code tattooed.

FIG. 8 shows an exemplary human-readable code portion 11 and an exemplary machine-readable code portion 12 on a rodent tail 13. 10 is the body end of the tail; 13 is the tip end of the tail. 14 shows a partial rodent body In some embodiments the human-readable code portion is also machine-readable.

In some embodiments, the human-readable code portion is unique within one current study, however, such a limitation is not a requirement for all embodiments.

In some embodiments, the machine-readable code portion is unique for all animals in a vivarium, or for all currently live animals in a vivarium. In some embodiments, the combination of the human-readable code portion and the machine-readable code portion is unique for all animals in a vivarium, or for all currently live animals in a vivarium. For example, the machine-readable code portion may map to a study ID.

In some embodiments an animal code, the data marked on the animal, is mapped via a mapping table to the animal ID. Such a mapping table is shown in FIG. 6. This may be true for just the human-readable portion, or just the machine-readable portion, or both. One advantage of this is that animal codes may be reused, while keeping the animal IDs unique, at least within a known scope, context, and time period. For such embodiments, the animal code may be called or thought of as a "token." The animal code, or token, is then used as (or is) an index into one or more mapping tables. One such map type is a "through map" meaning that some or all of the table lines comprise data that is the same as the index for that line. In these cases the code is then the same as the corresponding ID.

Continuing with FIG. 8, we see both a human-readable code portion 11 and a machine-readable code portion 12 marked on a rodent tail. 13 The rodent may be a mouse. The method of marking may be tattooing. The human-readable code 11 may comprise an alphanumeric character set comprising digits and Roman letters. The human-readable code may comprise digits, as shown 11 in this Figure. The human-readable code 11 may comprise an alphanumeric character set comprising digits and limited Roman letters such that the remaining Roman letters in the character set are easily recognizable and clearly distinguishable from digits or other Roman characters. The human-readable code portion may be one character, two characters, three characters, four characters, or five characters, or the range of 1-2, 1-3, 1-4, 2-3, 2-4, or 3-4 characters.

Some embodiments use symbol sets that are numeric only or alpha only. Symbol sets may comprise or consist of foreign (non English) alphabet symbols. Such symbol sets are expressly claimed. Numbers instead of alphanumeric human-readable symbol sets do not code as efficiently with respect to animal tail area, and thus are not preferred. Also, they may be more difficult of humans to read and memorize accurately. (Compare, for example, quickly memorizing five digits compared to three letters.)

The human-readable code portion 11 may code an animal ID, unique within a known scope. The human-readable code portion 11 may code an animal ID, unique within one animal study. The human-readable code portion 11 may be a first animal code, where the first animal code must be looked up in a first animal code-mapping table whose entries comprise the corresponding animal ID.

Continuing with FIG. 8, the machine-readable code portion 12 may be a vine code, with or without a spine. It may be a barcode known in the art. The spine is aligned with the tail such that the code is easy to read with machine vision, as the spine clearly demarks the location and curvature of the tail, and also provides a reference point for determining if the bars, (or "leaves") in the code are ascenders, descenders, full-height or missing. A rodent tail may not only curve dynamically with rodent activity, but also rotate around the tail axis. The tail may also curve upward. Thus, a code spine is valuable to determine all such distortions from an ideal, flat, rectangular, fixed substrate for the code marking. In addition, the tail may be partially covered with detritus, such as bedding or other material. A continuous spine makes if far easier to determine reliably if a portion of the machine-readable code is so obscured.

Prior art required white or black cage bottoms to machine-read a tail barcode. Prior art required cages to be free for bedding, as that might obscure a portion of the code, causing a misread. Use of a vine code with a spine eliminates these requirements as the dark markings on a light tail provide sufficient contrast, and use of a spine does not require that the edges of the tail be identifiable.

In some embodiments the machine-readable code portion 12 is an animal identifier within a known scope. In some embodiments the scope is all the animals in a vivarium. In some embodiments the scope is all the live animals in a vivarium. In some embodiments the scope is all the animals in a group of vivaria.

The machine-readable code portion 12 may be a second animal code, where the second animal code must be looked up in a second animal code-mapping table whose entries comprise the corresponding animal ID. The machine-readable code may be a second animal code, where the second animal code must be looked up in a second animal code-mapping table whose entries comprise a corresponding study ID.

In some embodiments the combination of the human-readable and the machine-readable code portions is an animal identifier within a known scope. In some embodiments this scope is all the animals in a vivarium. In some embodiments the scope is all the live animals in a vivarium. In some embodiments the scope is all the animals in a group of vivaria. In some embodiments the scope is all the live animals of all vivaria. In some embodiments the scope is all the animals of all vivaria.

The combination of the human-readable and the machine-readable code portions may be a third animal code, where the third animal code must be looked up in a third animal code mapping table whose entries comprise the corresponding animal ID.

The code space of the machine-readable code portion may be no more than 10,000; 100,000; 1,000,000; 10,000,000; or 100,000,000. The code space of the machine-readable code portion may be no more than 12 bits, 14 bits, 16 bits, 18 bits, 20 bits, 22 bits 24 bits, 26 bits, or 28 bits. The code space of the machine-readable code portion may in the range of 12-14 bits, 12-16 bits, 14-18 bits, 16-20 bits, 18-22 bits, 20-24 bits, or 22-28 bits, 14-20 bits, or 16-28 bits. The machine-readable code portion may or may not comprise check bits, parity bits, checksums, CRC, and forward error correction.

Turning now to FIG. 9 we see a code fragment, in Python, for straightening animal tail images. In this implementation, a tail is defined by a path, which is represented by cubic splines, which in turn are defined by map points.

In one exemplary embodiment a human-readable code comprising three digits is combined with a machine-readable code comprising a 4×4 vine code with a spine. The two codes do not encode the same information. The two codes are then used to index to a unique primary key for each animal in a larger population such as all animals in a vivarium or vivaria.

Codes are assigned using a particular method that minimizes the chances of a read error—either human or machine error—by maximizing the "distance" between used or planned-to-use codes. For example, digits may be comprised of a combination of well-known "seven-segment" straight lines segments. A "difference" between two digits is the number of segments that are different between the two digits. This might be viewed as a Hamming distance in a binary, seven-dimensional space. However, some embodiments use a modification or different distance metric or determination method. A distance between two three-digits codes might be the total number of differences between all respective digits.

Distance between two vine code leaves may be the number of leaf segments that are different between the two leaves, where a full-height leaf is viewed as composed of one short-up segment and one short-down segment. A distance between two vine codes might be the total number of differences between all respective leaves.

Some embodiments assign the human-readable code such that there are no duplicate codes within a segment of the entire animal code space. For example, the human-readable codes may be unique for all animals within one cage or one group of cages, or within one study or sub-study.

An exemplary embodiment of this invention selects a candidate pair of numbers, sometimes randomly, verifies that at least one candidate is not currently in use, then computes a distance between each candidate number in the pair and numbers currently in use. If the new candidates are both sufficiently distant, such as a Hamming distance, from existing numbers in use then this candidate pair is added to a set of number pairs in use. If either number in the pair is to close to an existing number, then either the candidate pair is discarded or the offending number in the pair is discarded and a new candidate pair is chosen. One a sufficient number of pairs are in the set, then these number pairs may be used to mark animals. When a number pair is marked on an animal, an animal record is created, typically using a primary key, which is unique over all animals in the system.

The steps of selecting numbers, validating them, and using them to mark animals may be overlapped. For example, each candidate number pair, when validated, may be used immediately to mark an animal. Similarly, such number pairs may only be created when needed to mark an animal. An animal record may be created first, then linked with marked number pairs.

Typically a number pair consists of a number for a human-readable code and a number for a machine-readable code. It is often desirable that within a subset of animals, such as animals in one study, the human-readable markings are all unique. This permits many activities involving the animal in that one study to read or record only the human-readable marking. Thus, the number for the human-readable marking may be checked for uniqueness or distance separately from the number for the machine-readable marking.

We often refer to the number for the human-readable marking as H; and the number for the machine-readable marking as M. The code for marking H may be simply digits, such as 348. However, the code for the machine-readable mark is typically not commonly humanly readable, such as a vine code. Thus, although one does not think generally of "encoding" the number 348 into a readable "348" marking, there is in fact a font or rules for such a marking. For example, the digits "348" may be marked using a common "seven-segment" format. Or, an OCR-type font or other font for numbers may be used. Note there is no restriction that the human-readable code be numeric or digits.

A primary advantage selecting numbers that maximize a computed "distance," such as a Hamming distance, is that both human read errors and machine read errors are reduced.

A primary advantage of using both a human-readable mark and a machine readable mark is that the human-readable mark may then be short and easily memorized and recorded without error, within a subset of animals, such as animals in one study. At the same time, the combination of both marks may be used to assure absolute identity and uniqueness of animals in a large population, such as a vivarium or vivaria. One advantage of a machine-readable mark is higher density recording on a very limited surface area such as a rodent tail. A second advantage is that a human technician will not mistake one (human-readable) marking for another (machine readable) marking.

An embodiment comprises reading codes, marks or markings, as described herein, including devices of reading and methods of reading. Embodiments include systems that use both reading and writing, which might be use, for example, as a comprehensive animal identification system in a vivarium.

For embodiments, those embodiments are claimed when the human-readable encoding, code or marking and its associated symbology, features and data table are claimed independent of the machine-readable encoding, code or marking.

For embodiments, those embodiments are claimed when the machine-readable encoding, code or marking and its associated symbology, features and data table are independent of the human-readable encoding, code or marking.

An embodiment comprises reading codes as described herein, including devices of reading and methods of reading. Embodiments include systems that use both reading and writing, which might be use, for example, as a comprehensive animal identification system in a vivarium.

A reading embodiment includes one that tracks the drift of the appearance of a marked code, mark or marking over time. Such changes include: stretching either lengthwise or width as the animal tail grows; distortion, such as adding curvature as the animal tail grows, ages, or distorts; change in color or contrast of the marking or the tail skin over time; blurring of lines over time; missing sections of line segments due to injury, shedding, cleaning and the like. On one embodiment such changes are tracked via one or metrics built into the "native" reading of a code. One such metric is the non-uniform stretch of bar spacing. For example, a tail does not grow uniformly. Thus, one end of a bar code may stretch more than the other end. Therefore, it is desirable to track such non-uniform stretching as the rodent grows and use that tracked metric (which may be averaged, or predicted) as a baseline of expected positions of symbol elements. Another example is the aspect ratio of either alphanumeric symbols or vine code symbols changing over time. Therefore, it is desirable to track such aspect ratio changes as the rodent grows and use that tracked metric (which may be averaged, or predicted) as a baseline of expected shapes of symbol elements. Such tracking and use of time-evolving metrics, tracked per animal, is expressly claimed.

Another aspect of change to animal markings consists of less-structured changes. For example, an injury or detritus may add a dark or light area to section of a marked code or the background tail skin. A recorded image of the rodent tail, including the section with the marked code, may then be used as a baseline for code recognition. For example, a permanent piece of detritus, or an injury, might obscure a section of code. Although that code section is no longer readable using the native code reading algorithm, by use of a recorded image of that animal tail, plus reading the remaining portions of the code, the animal can be uniquely and reliably identified. Thus, in this aspect, images of animal markings are recorded and tracked as they change over time, and these images (which may averaged) are used as part of animal code reading and animal ID determination. This aspect and these reading steps are expressly claimed as embodiments for both devices and methods.

Additional Embodiments

Embodiments of this invention explicitly include marking on parts of animals other than tails. Embodiments of this invention explicitly include humans as animals.

Embodiments of this invention include using the methods and algorithms to objects that are not animals, such as inanimate objects.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings.

Embodiments specifically include all independent claim limitations in all combinations with all independent claims.

Embodiments are claimed wherein the word "comprises" is replaced with the word, "consists," in one or more places in a claim.

Definitions

Code—The term, "code" has three different meanings depending on context. (i) It may be a method, algorithm, set of rules, or a standard of creating a mark or marking from an input, such as number or alphanumerics. For this meaning the word or process, "encoding" may be used, instead. (i) It may refer to the mark or marking itself. (iii) It may refer to entire process that comprises the first method, (i), as only a part of that process. For meanings (i) and (iii), one may consider that the encoding has an "input" and an "output." Nearly all encodings have a reverse "decoding." The input to an encoding may have a well-defined input symbol sets. The output of an encoding will have a well-defined output symbol set. An encoding may be the use of a font.

Combination—any combination of members of a set, including a null set and all members of a set, unless otherwise stated or obvious. The elements of the combination may be ordered or unordered. The elements may have fixed positions, or may have variable positions, or may have no positions.

Distance—The distance between two elements may be viewed generally as a Hamming distance, although different embodiments may compute distance differently, including modifications to a traditional Hamming distance. See www.wikipedia.org for industry technical description of Hamming codes. For embodiments herein, for numeric characters based on a "seven-segment" layout, each "hamming symbol" is one of the seven segments. The Hamming space may then be viewed as a binary 7-dimensional space. For leaves in a vine code where each leaf has four possible states (e.g. length) the Hamming space is a binary space with 4 dimensions. A distance for two specific single symbols in a symbol set generally sums the Hamming distance for all pairs of elements (where these elements are the "Hamming symbols") of the two symbols. A distance for a first group of symbols and a second group of symbols generally sums the Hamming distance for all respective pairs of symbols in the two groups. However, minimums or maximum distance may be used for selection. Note it is important to distinguish "Hamming symbols" from symbols marked as outputs from codes, such as one full decimal digit or one full leaf in a vine code. As a shortcut of referring to the Hamming distance (or other distance calculation) of output symbols from an encoding we may refer only to the distance of two input symbols or input values.

Distinct—two or more elements are distinct if they are not the same, or not effectively the same in the described context. For example, two numbers are distinct if they are not the same number. Two or more elements may be non-tangible or abstract elements, such as the set of numeric characters and the set of alphanumeric characters, or calculus and algebra. As another example, Code 39 is distinct from Code EAN 5.

Leaves—see definition for vine code. A null leaf is one that has no marking in the location for that leaf.

Pathogen-free—means the population of microbes, including but not limited to bacteria, viruses, prions and toxins, relevant to the experiment, are sufficiently reduced to meet the needs of the study, or to not impact the health, performance or behavior of the target animal population or of the workers.

Primary cage or home cage—the cage in which an animal spends more time than any other cage. Of note, there is a related term of art: "home cage." The definition of primary cage is, in some embodiments, the home cage. An aspect of home cage/primary cage deals with the fungibility of the actual cage itself. Each time a cage is changed, the physical cage is generally either disposed of or removed for washing, and replaced by a clean cage. The new physical cage is considered the same primary cage. A primary cage may sometimes be distinguished from a non-primary cage by the purpose of the cage. For example, a home cage may be for living in, as compared to an experimental cage to which the animal is transferred that is equipped or located for one or more particular experiments for the applicable study.

Sealed enclosure—an enclosure sealed against pathogens that impact or alter study results, or alter the credibility or repeatability of study results, entering or leaving the enclosure.

Sensor—may or may not include the use of local or remote processors, and may or may not include local or remote software executing on the local or remote processors. Sensors may or may not communicate over a network. Multiple sensors may or may not include common elements.

Spine—see definition for vine code.

Sterile—pathogen-free.

The primary cage is different from special purpose, behavioral-measurement, behavioral-detection, or behavioral-observation cages that are generally used for only a short time for the duration of a particular test due to cost and mindset.

Unique—occurs only once in the context or set defined to contain the element

Validate and Verify—the terms validate and verify are used interchangeably, unless clear otherwise from the context.

Vine code—a code, generally machine readable, generally not commonly human-readable, comprising a series of line segments of varying lengths, or varying positions, or both. Typically the line segments are placed parallel to each other with a gap in between. An axis may be defined perpendicular to such parallel line segments. The line segments may have one end aligned with the axis or may, in some cases, cross or not cross the axis depending on the choice of the line segment. Data is encoded in in the vine code by the variations in line length or position. Each line segment is called a leaf. The vine code may or may have starting or ending line segments, or both. Such starting or ending line segments may or may not encode data. Some leaves in some codes are missing. Generally, all line segments are equally spaced relative to the axis. The axis may or may not be printed or readable. A vine code may be marked in visible ink or may be marked using some other readable technology, including infrared, ultraviolet or magnet material. A vine code may be overlaid with another code such that they can be read independently. For example, a vine code may be printed in infrared ink while a human-readable code is printed overlaid in violet or blue ink. Filters may then be used to select one code over the other for reading. A human eye would not normally be able to see the infrared or ultraviolet ink.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "can," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

What is claimed is:

1. A method of reading marking animals comprising the following steps:
    (a) creating a series of S video frames of a first animal in a first cage wherein the first animal comprises a tail with a marked code;
    (b) extracting from each of the S video frames a body location and an angular body position of the first animal, using image processing;
    (c) extracting from each of the S video frames the tail location and a curvature of the tail of the first animal, using image processing;
    (d) creating from the S video frames S modified frames, each comprising an image of the tail straightened;
    (e) locating, in each of the S modified frames, D character areas;
    (f) computing, for each of the D character areas in each of the S modified frames, S probability sets, wherein each probability set comprises a probability for each of K distinct characters; wherein each probability is a probability that the each character area contains the each K distinct character, thus computing D*S probability sets;
    (g) summing the probabilities in each probability set for each of the D character areas, over the S modified frames, creating D aggregate probability sets, each with K aggregate probabilities;
    (h) choosing, from each of D aggregate probability sets, a chosen distinct character with a highest probability in the each set;
    (i) combining the D chosen distinct characters to create a first candidate number;
    (j) verifying the first candidate number is in a set of valid numbers;
    (k) associating with the first animal the first candidate number, if the verification in step (j) passes.

2. The method of claim 1 further comprising steps:
    (l) choosing, from at least one of the D aggregate probability sets, a chosen distinct next character with a next highest probability in the each set, if the difference between the highest probability and the next highest probability is less than a threshold; and
    (m) combining the D chosen distinct characters from step (h), substituting the at least one distinct next characters from step (l), to create a next candidate number;
    (n) verifying the next candidate number is in the set of valid numbers;
    (o) associating with the first animal the next candidate number, if the verification in step (j) fails and the verification in step (n) passes.

3. The method of claim 2 further comprising steps:
    (p) repeating steps (l) through (o) until the next candidate number from a repeated step (m) passes the verification in repeated step (n) or until a terminating condition is reached.

4. The method of claim 1 wherein:
D is in the range of 2 to 5.

5. The method of claim 1 wherein:
K is in the range of 5 to 26.

6. The method of claim 1 wherein:
K is in the range of 10 to 40.

7. The method of claim 1 wherein:
S is in the range of 3 to 100.

8. The method of claim 1 wherein:
S is in the range of 5 to 10,000.

9. The method of claim 1 wherein:
each of the K distinct characters is an alphanumeric character.

10. The method of claim 1 wherein:
the animal is a rodent.

11. The method of claim 1 wherein:
K is in the range of 2 to 10 and each of the K distinct characters is a possible leaf in a vine code.

12. The method of claim 11 wherein:
K is 4 and the vine code comprises a spine.

13. The method of claim 1 wherein:
the verifying step is responsive to a time of creating the series of S video frames.

14. The method of claim 1 wherein:
the steps (e) through (k) are performed independently, sharing steps (a) through (d), for both a human-readable code and a separate machine-readable code; and wherein:
the verifying step is performed independently for both the human-readable code and the separate machine-readable code; and wherein:
the human-readable code and the separate machine-readable code are the encodings of distinct numbers.

15. The method of claim 1 wherein:
the steps (e) through (k) are performed independently, sharing steps (a) through (d), for both a human-readable code and a separate machine-readable code; and wherein:
the verifying step is performed for the combination of both the human-readable code and the separate machine-readable code; and wherein:
the human-readable code and the separate machine-readable code are the encodings of distinct numbers.

16. The method of claim 1 wherein:
the size of D is variable and is determined in step (e).

17. A device for reading animal markings in a vivarium using the method of claim 1 comprising:
a stored-program computer comprising software and memory adapted to execute the steps of claim 1 (a) through (k).

18. A system for reading animal markings in a vivarium wherein;
the vivarium comprises animals marked by the method of claim 1 using the device of claim 17.

19. A method of reading markings on objects comprising the following steps:
(a) creating a series of S video frames of a first object wherein each of the S video frames comprises a marked code;
(b) extracting from each of the S video frames a mark location and an angular mark position, using image processing;
(c) extracting from each of the S video frames a distortion, using image processing;
(d) creating from the S video frames S modified frames, each comprising an image of the mark with the distortion removed;
(e) locating, in each of the S modified frames, D character areas;
(f) computing, for each of the D character areas in each of the S modified frames S probability sets, wherein each probability set comprises a probability for each of K distinct characters; wherein each probability is a probability that the each character area contains the each K distinct character, thus computing D*S probability sets;
(g) summing the probabilities in each probability set for each of the D character areas, over the S modified frames, creating D aggregate probability sets, each with K aggregate probabilities;
(h) choosing, from each of D aggregate probability sets, a chosen distinct character with a highest probability in the each set;
(i) combining the D chosen distinct characters to create a first candidate number;
(j) verifying the first candidate number is in a set of valid numbers;
(k) associating with the first object the first candidate number, if the verification in step (j) passes.

* * * * *